United States Patent [19]

Eldin

[11] 4,159,900
[45] Jul. 3, 1979

[54] METHOD OF CONNECTING OPTICAL FIBERS AND CONNECTION BENCH

[75] Inventor: Jacques Eldin, Viroflay, France

[73] Assignee: Compagnie Industrielle des Telecommunications Cit-Alcatel S.A., Paris, France

[21] Appl. No.: 732,742

[22] Filed: Oct. 15, 1976

[30] Foreign Application Priority Data

Oct. 22, 1975 [FR] France .................................. 75 32298

[51] Int. Cl.² .............................................. C03B 37/00
[52] U.S. Cl. ...................... 65/4 B; 65/11 R; 65/42; 65/DIG. 7; 156/158
[58] Field of Search ........... 156/158; 264/1, DIG. 75; 350/96 B, 96, 20; 425/108; 65/11 R, 139, 35, 42, 152, 4 B, DIG. 7

[56] References Cited

U.S. PATENT DOCUMENTS

| 3,615,312 | 10/1971 | Landry | 65/42 X |
|---|---|---|---|
| 3,768,146 | 10/1973 | Braun et al. | 65/DIG. 7 |
| 3,798,099 | 3/1974 | Marcatili | 156/158 |
| 3,849,219 | 11/1974 | Hall-Jackson | 65/DIG. 7 |
| 3,919,037 | 11/1975 | Miller | 156/158 X |
| 3,948,582 | 4/1976 | Martin | 65/DIG. 7 |

*Primary Examiner*—Robert L. Lindsay, Jr.
*Attorney, Agent, or Firm*—Roland Plottel

[57] ABSTRACT

The present invention relates to a method of connecting optical fibers by using a capillary tube which is flared at both ends. The capillary tube is formed so that its bore is cylindrical along at least half of its length, the fibers are inserted into the bore by vibration until their respective end faces come into contact with each other and the capillary tube is then heated to its softening point (at least at its ends) and allowed to cool to obtain a tightening of the ends of these fibers.

5 Claims, 5 Drawing Figures

METHOD OF CONNECTING OPTICAL FIBERS AND CONNECTION BENCH

The invention relates to data transmission technology by means of a light beam which passes through optical fibers of very small diameter.

A system of transmission by light beams usually includes a transmission light source on one side, e.g. a light emitting diode or a laser diode, a photosensitive receiving element on the other side, e.g. a photodiode and a waveguide, e.g. having optical fibers, between the source and the photosensitive element. The small transversal dimensions of each of the glass fibers (the core e.g. made of doped silica has a diameter in the order of 75 $\mu$m or less and the cladding e.g. made of pure silica has a diameter in the order of 125$\mu$m) requires a special fiber connection technology if very high precision alinement of the fibers is to be obtained. Indeed, transmission mode stability decreases and energy attenuation increases rapidly with alinement errors.

These requirements have led up till now to various devices. For example, published French patent application, No. 2,178,963 in the name of Western Electric Company, describes an optical fiber connection device which as a capillary tube intended for alining adjacent ends and a device for connecting the adjacent ends once they are in the tube. The central part of the tube has an inside diameter which is slightly greater then the outside diameter of the fibers while the tube's ends are slightly flared and facilitate the insertion of the fibers. The tube is provided with a transversal opening in the fiber connection zone. The connection device is constituted by a bead made of transparent thermoplastic material having a refraction index which is very closed to that of the fibers and a melting point which is clearly lower than of the fibers. The bead is inserted in the transversal opening of the tube.

The tube is electrically conductive or has an electrically conductive external coating, the conductive coating being obtained by depositing a chromium-gold in a vacuum on the surface of the tube or by spraying a layer of indium oxide.

The passing of an electric current in the tube heats the latter by virtue of its resistance; the heat generated in the tube is transmitted by conduction to the fibers and to the bead. The latter softens, melts and flows along between the ends of the alined fibers. After cooling, the thermoplastics material hardens and forms a connection between the two fibers.

Other embodiments are also known; for example Siemen's German published application No. 2,363,987 describes a fiber connection device comprising a capillary tube whose bore has an internal diameter which is at least twice as large as that of the fibers. This tube is heated to receive indentations disposed on the tube at 120° from one another. At the place where the indentations are thus formed, the bore; these indentations make it possible to aline the fibers in the tube.

In these two types of embodiment given, there are two contradictory problems which are related to the constitution of a connection, insertion of the fibers and alinement of the fibers.

In the first type of prior art embodiment, where tube has bore has a diameter close to that of the fibers, the fibers are easily alined; but it is difficult to insert them and position them relative to the central portion of the bore. The thermoplastic bead provides a direct connection between the two fibers.

In the second type of prior art embodiment, where the tube has a bore of a diameter which is large in relation to that of the fibers, insertion of the fibers is easy but they are difficult to aline. The set of indentations formed in the tube narrows the internal passage locally to aline the fibers.

The present invention aims at producing an optical fiber connection by means of a capillary tube, having an internal bore with a diameter very close to that of the fibers, by implementing a simple method not requiring specialized personnel.

The present invention provides a method of connecting optical in a capillary tube having a bore whose diameter, at least over a central portion of the bore length, is very slightly greater than the diameter of the fibers to be accomodated therein for connection, wherein the fibers are guided into the tube until their end faces are in contact with each other in the central portion of the tube and transverse vibrations of small amplitude are applied to the fibers while they are being guided into the tube.

The present invention also provides an optical fiber connection bench for connecting two bundles of optical fibers comprising a beam mounted on a support and in mechanical contact with a vibrator for applying transverse vibrations to the beam, the beam supporting two fiber support parts, one for each bundle of optical fibers, each fiber support part being slideably mounted on the beam and including a plurality of fiber retaining passages alined with the beam, the beam further supporting a capillary tube support part disposed in between the fiber support parts and including a plurality of capillary tubes retaining passages alined with the beam, the disposition of the fiber and the tube retaining passages being identical so that, in operation, fibers from the two bundles may be clamped in respective ones of the fiber retaining passages with an appropriate length of bared fiber end projecting toward the tube support part, the tube support part fitted with capillary tubes, and the fiber support parts moved towards each other and the tube support part with the vibrator in operation until the ends of corresponding fibers about in their respective tubes.

Embodiments of the invention are described by way of example with reference to the accompanying drawings in which.

Figure 1:
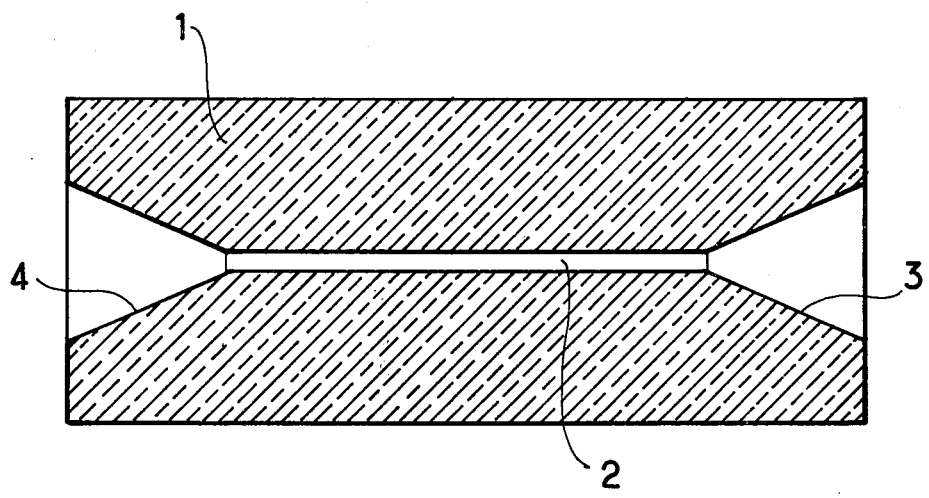
FIGS. 1 and 2 are cross-sections on a much enlarged scale of a capillary tube intended for ensuring a connection between two optical fibers and this same capillary tube once the connection has been formed.

FIG. 1 shows a capillary tube 1 intended to provide the connection of two optical fibers. The capillary tube 1 is made of glass having a melting point which is clearly lower than that of the fibers and has a coefficient of thermal expansion slightly greater than that of the fibers, it is made e.g. of borosilicate. The bore 2 of the capillary tube is flared at both its ends 3 and 4 but it is cylindrical along at least half its length and has a diameter very slightly greater than the outside diameter of the fibers. The length of the capillary tube is so chosen that each of the two fibers to be connected is engaged therein along a length at least equal to ten times the outside diameter of the fibers.

By way of an example, in the case of optical fibers having an outside diameter of 100 μm, the capillary tube is chosen with a length in the order of 5 mm, the bore 2 is cylindrical along a length of about 4 mm and has a diameter close to 110 μm along this cylindrical part; the two ends of the bore, each having a length in the order of 500 μm, are conical, the diameter of their opening is in the order of 1 mm. The capillary tube has an outside diameter in the order of 2 mm.

Figure 3:
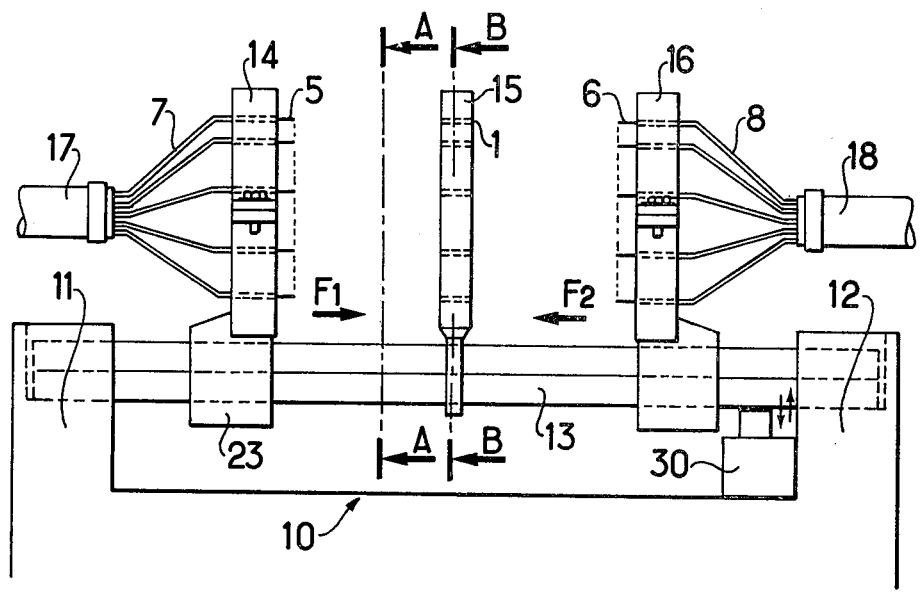
FIG. 3 is a side view of an installation for implementing the method according to the invention and FIGS. 4 and 5 are an end view a cross-section along lines AA and BB in FIG. 3.
Figure 4:
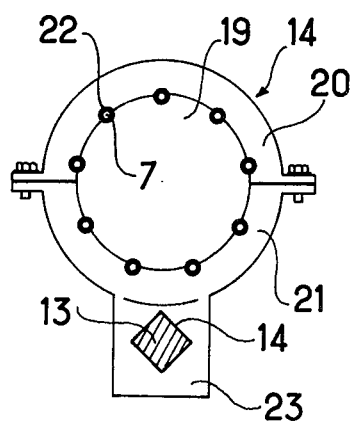
Figure 5:
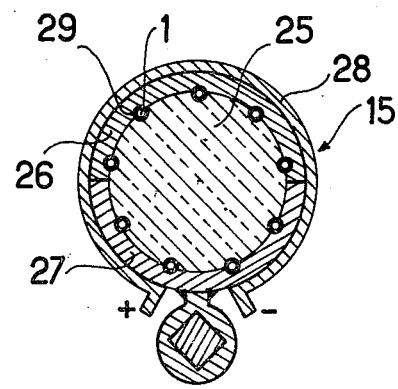

As will be explained with reference to FIGS. 3 to 5, the optical fibers are inserted in the capillary tube 1 by guiding the fibers into the passage and vibrating them while they are being guided until the end faces of the fibers come into contact with each other at the central part of the passage. Prior to the insertion of the fibers in the tube a protective covering 7, 8 (see FIG. 2) is stripped from the ends of the fibers and their end faces are prepared e.g. by clean breakage.

Once fibers are in place in the tube, at least the ends of capillary tubes are heated to its softening temperature. This is done by heating the entire capillary tube (or merely its ends) to a regulated temperature between 400° and 700° C. according to the type of glass of which the capillary tube is made. The ends of the tube having reached the softening point, the capillary tension of the glass produces a gripping effect at the ends of the tube on the fibers. The cooling of this clamping can, of course, be controlled by nipping the ends of the capillary tube.

Figure 2:
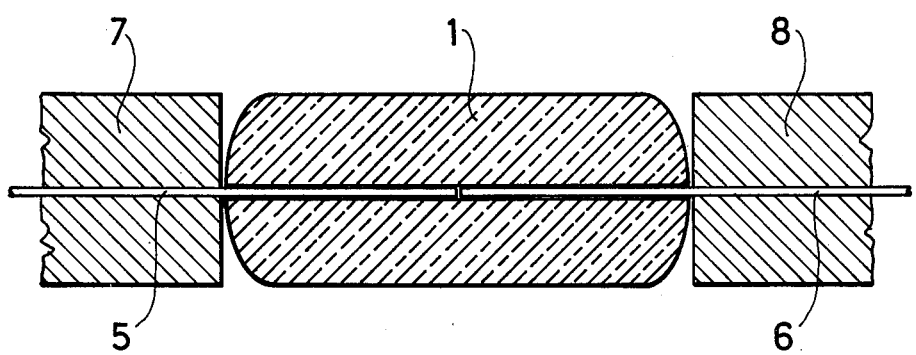

FIG. 2 shows the finished connection. The capillary tube 1 contains two optical fibers 5 and 6, the ends of the tube grip the fibers and hold them in the tube.

On either side of the capillary tube 1, the fibers are always covered with their protective covering 7 or 8 made e.g. of a plastics material. These coverings 7 and 8, extending initially along the whole length of the fibers, have been so cut that when the front faces of the ends of the fibers are in contact in the central part of the tube, the ends of the coverings come practically in contact with the ends of the capillary tube.

To improve the efficiency of the connection produced, it is also possible, prior to the insertion of the fibers, to wet their end faces with a liquid whose refraction index is close to that of the cores of the fibers.

The capillary tube according to FIG. 1 having dimensions which are defined as a function of the diameter of the optical fibers to be connected, is produced by drawing a long glass tube whose outside diameter and bore diameter are large in relation to the corresponding dimensions to be obtained. The initial tube passes through a crucible and between pairs of drive rollers. The drawing speed and the temperature of the crucible are regulated so that the drawn tube has a bore with a predetermined diameter which is very slightly larger than that of the fibers to be connected.

The capillary tubes for connecting fibers are then formed by cutting up the drawn tube into sections which are about 5 mm long. In another embodiment, the drawn tube is cut up into very long sections, e.g. 1 m, these sections then being assembled in bundles by means of a binder such as those used in glassmaking, then the bundles are cut up by means of a diamond saw to form sets of capillary tubes having the required length, in the order of 5 mm. The cones at the ends of the capillary tubes (FIG. 1) are formed by abrasive machining.

The individual capillary tubes obtained directly from the drawn tube or from the sets of tubes separated from one another by means of a suitable solvent are then in the form shown in FIG. 1. Of course a microscopic examination or an examination entailing other enlarging means is effected after the initial tube has been drawn in order to select only capillary tubes having the required dimensions.

The insertion of the fibers in the capillary tubes such as the one in FIG. 1 is described with reference to FIGS. 3 and 5.

A mechanical-assembly or fiber-connection bench has a horizontal stand 10 with two vertical arms 11 and 12. These vertical arms 11 and 12 support a beam 13 having a rectangular cross-section which rests e.g. on the bottom two U's in the ends of the respective arms.

The beam 13 bears a first fiber support part 14, a tube support part 15 and a second fiber support part 16, the tube support part being disposed between the other two. These three support parts 14-16 are intended to provide simultaneously a multifiber connection, i.e. a connection between pairs of fibers belonging to two bundles such as 17 and 18. The fiber support parts 14 and 16 are linearly slideable along the beam 13. The tube support 15 is stationary on the beam 13.

The first fiber support part 14 has cylindrical central part 19 and two semi-cylindrical peripheral parts 20 and 21 assembled together and surrounding the central part. These parts are made e.g. of steel. The periphery of the central part 19 and the inner surface of the peripheral parts 20 and 21 have grooves delimiting cylindrical passages such as 22 for the fibers 5 (each covered with its covering 7) of the bundle of fibers 17.

The covered fibers pass through the fiber support part 14; the ends of the fibers are stripped and protrude slightly beyond the support part 14, each along a length substantially equal to half the length of the capillary tube (FIG. 1). The lower peripheral part 21 incorporates a stand 23 having a rectangular apperture threaded on the beam 13, thereby retaining the support part 14 on the beam 13 while enabling a linear sliding movement of the support part there-along.

The fiber support part 16 is identical to the part 14; it accomodates the fibers of the bundle 18, whose bared ends 6 also protrude beyond its surface in a like manner to the ends of the fibers 5, so that the bared ends of each pair of fibers to be connected correspond to the length of the calibrated tube.

The tube support part 15 has a central part with a circular cross-section 25 made e.g. of quartz, two parts 26 and 27 with a semi-circular cross-section made e.g. of steel assembled on each other to surround the central part and an outside electric conductor 28 forming an annular spring assembled around the two semi-circular parts 26 and 27. The central part and the semi-circular parts 26 and 27 are perforated after assembly with cylindrical passages such as 29 intended to accomodate the capillary tubes 1 (according to FIG. 1). These passages define semi-cylindrical grooves on the periphery of the central part and on the inside surface of each of the semi-circular parts 25 and 27.

The ends of the outside conductor 28 can be connected to an electricity supply source, to obtain the required quantity of heat for heating the tubes to their softening point from the heat dissipation in the conductor, this heat being transmitted through the steel parts 26 and 27.

The insertion bench has also a vibrator 30 such as an electromagnet imparting low-amplitude transversal vibrations in the order of 10 μm to the beam and hence to the parts supported by the beam.

Once the capillary tubes are accomodated in the passages of the tube support part 15 and the fibers of the bundles 17 and 18 are inserted in the passages 22 of the fiber support parts and prepared for the connections to be made (ends bared and cut to the required length), the vibrator 30 is switched on and the two fiber support parts 14 and 16 are moved in a linear sliding movement in the direction of the arrows $F_1$ and $F_2$ towards the tube support part 15 (e.g. by hand) until the fiber support parts abut against the tube support part. The ends of the pairs of fibers to be connected and their respective tubes are initially positioned with precision. The vibrations which are applied to the beam are transmitted to the fibers and to the tubes during the linear sliding movement of the fiber support parts. These vibrations facilitate the sliding of each of the fibers inside the passage of the tube which is to accomodate it, up to its central part, despite the diameter of the tube bores being chosen very close to that of the tube. When the connection has been formed (i.e. after heating softening and cooking the various parts constituting the fiber support parts and the tube support parts are dismantled to release the fibers connected in pairs by means of the respective tubes in which they are held.

The connections thus obtained can be formed rapidly and do not require any particular or delicate operation.

What is claimed is:

1. An optical fiber connection bench for connecting two bundles each of n optical fibers in n capillary tubes each of which has a bore whose diameter, at least over a central portion of the bore length, is very slightly greater than each diameter of the two fibers to be accommodated therein for connection, wherein the fibers are guided into the tube until their faces are in contact with each other in the central portion of the tube and transverse vibrations of small amplitude are applied to the fibers while they are being guided into the tube, comprising a beam mounted on a support, a vibrator in mechanical contact with the beam for applying transverse vibrations to the beam, two fiber support parts supported by said beam, one of said parts for each bundle of optical fibers, each fiber support part being slideably mounted on the beam and including a plurality of fiber retaining passages alined with the beam, a capillary tube support part also supported by said beam and being disposed in between the fiber support parts and including a plurality of capillary tubes retaining passages alined with the beam, the disposition of the fiber and the tube retaining passages being identical so that, in operation, fibers from the two bundles may be clamped in respective ones of the fiber retaining passages with an appropriate length of bared fiber end projecting towards the tube support part, the tube support part fitted with capillary tubes, and the fiber support parts moved towards each other and the tube support part with the vibrator in operation until the ends of the corresponding fibers are properly spaced in their respective tubes.

2. A connection bench according to claim 1 wherein the tube support part comprises a central support with a circular cross-section, two semi-cylindrical parts which can be assembled on the central support surrounding it and delimiting the tube retaining passages between the semi-cylindrical parts and the support and an outside electric-conductor installed on the two semi-cylindrical parts and having ends which has means for connection to an electricity supply source to provide heat for raising glass tubes to their softening point.

3. A connection bench according to claim 2, wherein each of the fiber support parts comprises a central support having a circular cross-section and by two semi-cylindrical parts assembled on the central support, surrounding it and delimiting the fiber-retaining passages between the said semi-cylindrical parts and the central support.

4. A method of connecting optical fibers comprising the steps of choosing two fibers of the same optical properties and melting point, choosing a capillary tube having a melting point lower than that of the fibers and having a bore whose diameter, at least over a central portion of the bore length, is very slightly greater (e.g., 10 μm) than the diameter of the fibers to be accommodated therein for connection, wetting the end face of at least one of the fibers with a liquid whose refractive index is close to that of the fibers' cores, guiding the fibers into the tube until their end faces are in contact with each other in the central portion of the tube and the wetting liquid is joins both end faces of the fibers, while applying transverse vibrations of small amplitude to the tube/fibers while they are being guided into the tube, and then heating said tube at its ends to its softening point and then cooling to cause said tube to grip the fibers.

5. A method according to claim 4, wherein the tube has a length such that the length of each fiber engaged in the tube is at least equal to ten times the diameter of the fibers.

* * * * *